(12) United States Patent
Moman et al.

(10) Patent No.: US 11,254,757 B2
(45) Date of Patent: Feb. 22, 2022

(54) PROCESS TO PREPARE A SOLID SUPPORT FOR A PROCATALYST SUITABLE FOR POLYMERIZATION OF OLEFINS

(71) Applicant: SABIC GLOBAL TECHNOLOGIES B.V., Bergen op Zoom (NL)

(72) Inventors: Akhlaq Moman, Geleen (NL); Inaamul Haq Siddiqui, Geleen (NL); Sudhakar R. Padmanabhan, Geleen (NL); Abdulaziz Hamad Al-Humydi, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 292 days.

(21) Appl. No.: 16/340,941

(22) PCT Filed: Oct. 11, 2017

(86) PCT No.: PCT/EP2017/075904
§ 371 (c)(1),
(2) Date: Apr. 10, 2019

(87) PCT Pub. No.: WO2018/069379
PCT Pub. Date: Apr. 19, 2018

(65) Prior Publication Data
US 2019/0225715 A1     Jul. 25, 2019

Related U.S. Application Data

(60) Provisional application No. 62/469,617, filed on Mar. 10, 2017.

(30) Foreign Application Priority Data

Oct. 12, 2016  (EP) .................................. 16193411

(51) Int. Cl.
*C08F 4/02* (2006.01)
*B01F 7/22* (2006.01)
(Continued)

(52) U.S. Cl.
CPC ................ *C08F 4/022* (2013.01); *B01F 7/22* (2013.01); *B01F 15/00915* (2013.01);
(Continued)

(58) Field of Classification Search
CPC ...... C08F 4/022; C08F 4/6548; C08F 4/6565; C08F 4/65916; C08F 110/06; B01J 37/04; B01J 2219/00189
See application file for complete search history.

(56) References Cited

U.S. PATENT DOCUMENTS

| 4,946,816 A | 8/1990 | Cohen et al. |
| 6,780,808 B2 | 8/2004 | Wagner et al. |

(Continued)

FOREIGN PATENT DOCUMENTS

| EP | 0613912 A2 | 9/1994 |
| EP | 1538167 A1 | 6/2005 |

(Continued)

OTHER PUBLICATIONS

International Search Report for International Application No. PCT/EP2017/075904, International Filing Date Oct. 11, 2017, dated Jan. 23, 2018, 4 pages.

(Continued)

*Primary Examiner* — Catherine S Branch
(74) *Attorney, Agent, or Firm* — Cantor Colburn LLP

(57) ABSTRACT

The invention relates to a process for preparing a solid support for a procatalyst suitable for preparing a catalyst composition for olefin polymerization, said process for preparing said solid support comprising reacting a compound $R^4_z MgX^4_{2-z}$ with a silane compound $Si(OR^5)_{4-n}(R^6)_n$ (Continued)

Figure 1:
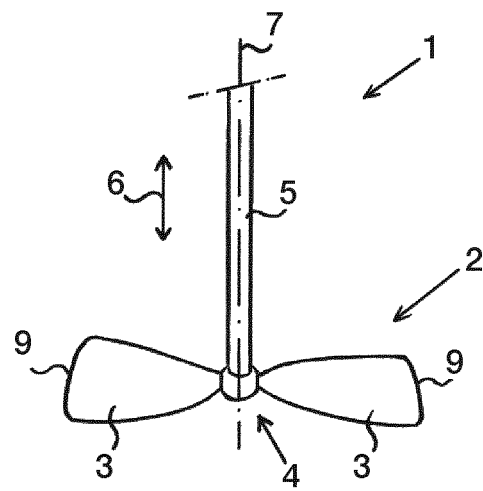

in a solvent and mixing the resulting mixture with a mixing device and at a certain mixing speed in order to give a solid support $Mg(OR^1)_x X^1_{2-x}$ said solid support obtained having an average particle size of at most 17 µm, preferably at most 16 or 14 µm, more preferably at most 12 µm. The invention further relates to a solid support, a process for preparing a procatalyst and said procatalyst as well as polyolefins obtained using said procatalyst.

10 Claims, 2 Drawing Sheets

(51) Int. Cl.

| | | |
|---|---|---|
| *B01F 15/00* | (2006.01) | |
| *B01J 37/04* | (2006.01) | |
| *C08F 4/654* | (2006.01) | |
| *C08F 4/656* | (2006.01) | |
| *C08F 4/659* | (2006.01) | |
| *C08F 110/06* | (2006.01) | |
| *B01J 19/00* | (2006.01) | |
| *C08F 2/34* | (2006.01) | |

(52) U.S. Cl.
CPC ......... *B01J 19/006* (2013.01); *B01J 19/0066* (2013.01); *B01J 37/04* (2013.01); *C08F 4/6548* (2013.01); *C08F 4/6565* (2013.01); *C08F 4/65916* (2013.01); *C08F 110/06* (2013.01); *B01F 2215/0481* (2013.01); *B01J 2219/00189* (2013.01); *B01J 2219/00768* (2013.01); *B01J 2219/00779* (2013.01); *C08F 2/34* (2013.01); *C08F 2500/15* (2013.01); *C08F 2500/18* (2013.01)

(56) References Cited

U.S. PATENT DOCUMENTS

| | | |
|---|---|---|
| 2011/0269928 A1 | 11/2011 | Fujiwara et al. |
| 2013/0225398 A1 | 8/2013 | Chen et al. |
| 2015/0299346 A1 | 10/2015 | Chen et al. |
| 2019/0225716 A1 | 7/2019 | Sainani et al. |
| 2019/0225718 A1 | 7/2019 | Sainani et al. |
| 2020/0048378 A1 | 2/2020 | Moman et al. |
| 2020/0055968 A1 | 2/2020 | Moman et al. |

FOREIGN PATENT DOCUMENTS

| | | | | |
|---|---|---|---|---|
| EP | 1783145 A1 | | 5/2007 | |
| EP | 2027164 B1 | | 8/2012 | |
| EP | 2837634 A1 | * | 2/2015 | ............. C07F 7/025 |
| WO | 9632427 A1 | | 10/1996 | |
| WO | 2011106494 A1 | | 9/2011 | |
| WO | 2013124063 A1 | | 8/2013 | |
| WO | 2014001257 A1 | | 1/2014 | |
| WO | 2015091983 A1 | | 6/2015 | |
| WO | 2015091984 A1 | | 6/2015 | |
| WO | WO-2015091980 A1 | * | 6/2015 | ............. C08F 110/06 |
| WO | WO-2015091982 A1 | * | 6/2015 | ............. C08F 210/16 |
| WO | 2015185489 A1 | | 12/2015 | |
| WO | 2015185490 A1 | | 12/2015 | |
| WO | 2015193291 A1 | | 12/2015 | |

OTHER PUBLICATIONS

Written Opinion for International Application No. PCT/EP2017/075904, International Filing Date Oct. 11, 2017, dated Jan. 23, 2018, 6 pages.

Pasquini, N (ed.) "Polypropylene handbook," Carl Hanser Verlag Munich; 2005, 11 Pages, 2nd edition, Chapter 6.2.

Pullukat, Thomas J. and Hoff, Raymond E., "Silica-Bases Ziegler-Natta Catalystis: A Patent Review", Catal. Rev.-Sci. Eng. 41(3&4), 1999, pp. 389-438.

\* cited by examiner

PROCESS TO PREPARE A SOLID SUPPORT FOR A PROCATALYST SUITABLE FOR POLYMERIZATION OF OLEFINS

CROSS REFERENCE TO RELATED APPLICATIONS

This application is a National Stage application of PCT/EP2017/075904, filed Oct. 11, 2017, which claims the benefit of U.S. Provisional Application No. 62/469,617, filed Mar. 10, 2017, and European Application No. 16193411.2, filed Dec. 12, 2016, all of which are incorporated by reference in their entirety herein.

BACKGROUND

The invention relates to a process to prepare a solid support for a procatalyst suitable for polymerization of olefins. The invention also relates to said solid support for a procatalyst obtained. Furthermore, the invention is directed to a process to prepare a procatalyst and the procatalyst obtained therewith. Moreover, the invention is directed to a catalyst system for polymerization of olefins comprising said procatalyst, optionally a co-catalyst and optionally an external electron donor. In addition, the invention is related to a process of making polyolefins by contacting at least one olefin with said catalyst system. Moreover, the present invention relates to polymers obtained by polymerization using said procatalyst and to the shaped articles of said polymers.

Catalyst systems and their components that are suitable for preparing a polyolefin are generally known. One type of such catalysts is generally referred to as Ziegler-Natta catalysts. The term "Ziegler-Natta" is known in the art and it typically refers to catalyst systems comprising an organo-metallic compound (also typically referred to as a co-catalyst) and optionally one or more electron donor compounds (e.g. external electron donors) and a transition metal-containing solid catalyst compound (also typically referred to as a procatalyst), comprising a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1. There is an on-going need in industry for phthalate free catalyst for preparing polymers.

It is an object of the invention to provide an improved process for a phthalate free procatalyst for polymerization of olefins. It is a further object of the present invention is to provide a procatalyst which shows good performance, especially shows an improved productivity and bulk density.

SUMMARY

At least one of the aforementioned objects of the present invention is achieved with the several aspects discussed below.

The present invention relates to a process for preparing a solid support for a procatalyst suitable for preparing a catalyst composition for olefin polymerization, said process for preparing said solid support comprising reacting: a compound $R^4_z MgX^4_{2-z}$ with a silane compound $Si(OR^5)_{4-n}(R^6)_n$ in a solvent and mixing the resulting mixture with a mixing device and at a certain mixing speed in order to give a solid support $Mg(OR^1)_x X^1_{2-x}$, said solid support obtained having an average particle size of at most 17 μm, preferably at most 16 or at most 14 μm, more preferably at most 12 μm. In the above:

$R^1$ and $R^4$ are each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;

$X^4$ is each independently selected from the group of consisting of fluoride (F—), chloride (Cl—), bromide (Br—) or iodide (I—), preferably chloride;

z is in a range of larger than 0 and smaller than 2, being 0<z<2;

$R^5$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;

$R^6$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;

n is in range of 0 to 4, preferably n is from 0 up to and including 1;

$X^1$ is each independently selected from the group of consisting of fluoride (F—), chloride (Cl—), bromide (Br—) or iodide (I—), preferably chloride;

x is in a range of larger than 0 and smaller than 2, being 0<x<2.

In an embodiment, a mixing device with propeller blades is used. In an embodiment, a reactor with at least two baffles is used. In an embodiment, the mixing is started with an initial mixing speed and wherein the speed is increased to a final mixing speed wherein the initial mixing speed is lower than the final mixing speed, preferably wherein the initial mixing speed is between 30 and 450 rpm, preferably between 100 and 400 rpm and/or wherein the final mixing speed is between 150 and 750 rpm, preferably between 450 and 600 rpm.

The invention also relates to a solid support for a procatalyst obtainable by the process according to the invention. The invention also relates to a process for preparing a procatalyst for preparing a catalyst composition for olefin polymerization, said process comprising the steps of:

Step 1) preparing a solid support according to the process of the invention discussed above;

Step 2) optionally contacting solid support obtained in step 1) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain an intermediate reaction product; wherein: $M^1$ is a metal selected from the group consisting of Ti, Zr, Hf, Al or Si; $M^2$ is a metal being Si; v is the valency of $M^1$ or $M^2$ and w<v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms;

Step 3) reacting the solid support or intermediate reaction product, obtained respectively in step 1) or 2), with a halogen-containing Ti-compound, optionally an activator and at least one internal electron donor to obtain a procatalyst.

In an embodiment, in step 3) as activator ethylbenzoate is used and wherein as internal electron donor 4-[benzoyl (methyl)amino]pentan-2-yl benzoate (AB) is used. In an embodiment, in step 3) as activator ethylbenzoate is used and wherein as internal electron donor 4-[(ethoxycarbonyl)-(methyl)amino]pentan-2-yl ethyl carbamate (AB-OEt) is used. In an embodiment, in step 3) as activator dimethylbenzamide (BA-2Me) is used and wherein as internal electron donor 9,9-bis(methoxymethyl)fluorene (Flu) is used. In an embodiment, in step 3) as internal electron donor di-n-butylphthalate (DnBP) or diisobutylphthalate (DIBP) is used.

The invention also relates to a procatalyst obtained or obtainable by the process according to the invention. The invention also relates to a catalyst system comprising a procatalyst according to the invention, a co-catalyst and optionally an external electron donor. The invention also relates to a process for the preparation of polyolefins comprising the contacting of the catalyst system according to the invention with at least one olefin, preferably a propylene to prepare polypropylene homopolymer or a mixture of propylene and an olefin, such as ethylene, butene or hexene, to prepare a propylene-olefin copolymer. The invention also relates to a polyolefin, preferably a polypropylene or a propylene-olefin copolymer, obtainable by the process according to the invention. The invention also relates to a shaped article comprising the polyolefin of the invention.

Definitions

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprises catalytic species supported on a metal or metalloid compound (e.g. a magnesium compound or a silica compound).

"catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N).

"external donor" or "external electron donor" or "ED" as used in the present description means: an electron-donating compound used as a reactant in the polymerisation of olefins. It comprises at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst prior to or simultaneously with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" as used in the present description have the same meaning: a component of a catalyst composition generally comprising a solid support, a transition metal-containing catalytic species and optionally one or more internal donor.

"halide" or "halogen" as used in the present description means: an ion selected from the group of: fluoride (F—), chloride (Cl—), bromide (Br—) or iodide (I—).

"Heteroatom" as used in the present description means: an atom other than carbon or hydrogen. However, as used herein—unless specified otherwise, such as below,—when "one or more heteroatoms" is used one or more of the following is meant: F, Cl, Br, I, N, O, P, B, S or Si. Thus a heteroatom also includes halides.

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl. A hydrocarbyl group may be substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. An alkyl group also encloses aralkyl groups wherein one or more hydrogen atoms of the alkyl group have been replaced by aryl groups.

"aryl" as used in the present description means: an aryl group being a functional group or side-chain derived from an aromatic ring. An aryl group and may be un-substituted or substituted with straight or branched hydrocarbyl groups. An aryl group also encloses alkaryl groups wherein one or more hydrogen atoms on the aromatic ring have been replaced by alkyl groups.

"alkoxide" or "alkoxy" as used in the present description means: a functional group or side-chain obtained from an alkyl alcohol. It consists of an alkyl bonded to a negatively charged oxygen atom.

"aryloxide" or "aryloxy" or "phenoxide" as used in the present description means: a functional group or side-chain obtained from an aryl alcohol. It consists of an aryl bonded to a negatively charged oxygen atom.

"Grignard reagent" or "Grignard compound" as used in the present description means: a compound or a mixture of compounds of formula $R^4_zMgX^4_{2-z}$ ($R^4$, z, and $X^4$ are as defined below) or it may be a complex having more Mg clusters, e.g. $R_4Mg_3Cl_2$.

"polymer" as used in the present description means: a chemical compound comprising repeating structural units, wherein the structural units are monomers, "olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"MWD" or "Molecular weight distribution" as used in the present description means: the same as "PDI" or "polydispersity index". It is the ratio of the weight-average molecular weight ($M_w$) to the number average molecular weight ($M_n$), viz. $M_w/M_n$, and is used as a measure of the broadness of molecular weight distribution of a polymer. $M_w$ and $M_n$ are determined by GPC using a Waters 150° C. gel permeation chromatograph combined with a Viscotek 100 differential viscosimeter; the chromatograms were run at 140° C. using 1,2,4-trichlorobenzene as a solvent; the refractive index detector was used to collect the signal for molecular weights.

"XS" or "xylene soluble fraction" or "CXS" or "cold soluble xylene fraction" as used in the present description means: the weight percentage (wt. %) of soluble xylene in the isolated polymer, measured according to ASTM D 5492-10.

"span" as used in the present description means: (d90-d10)/(d50), wherein d10, d50, and d90 are the intercepts for 10%, 50% and 90% of the cumulative mass.

"bulk density" as used in the present description means: the weight per unit volume of a material, including voids inherent in the material as tested. Bulk density is measured as apparent density according to ASTM D1895-96 Reapproved 2010-e1, test method A.

"polymerization conditions" as used in the present description means: temperature and pressure parameters within a polymerization reactor suitable for promoting polymerization between the catalyst composition and an olefin to form the desired polymer. These conditions depend on the type of polymerization used.

"production rate" or "yield" as used in the present description means: the amount of kilograms of polymer produced per gram of procatalyst consumed in the polymerization reactor per hour, unless stated otherwise.

"MFR" or "Melt Flow rate" as used in the present description is measured at a temperature of 230° C. with 2.16 kg load and measured according to ISO 1133:2005.

Unless stated otherwise, when it is stated that any R group is "independently selected from" this means that when several of the same R groups are present in a molecule they may have the same meaning or they may not have the same meaning. The present invention is described below in more detail with reference to the accompanying schematic drawings. All embodiments described with respect to one aspect of the present invention are also applicable to the other aspects of the invention, unless otherwise stated.

DRAWINGS

Figure 2:
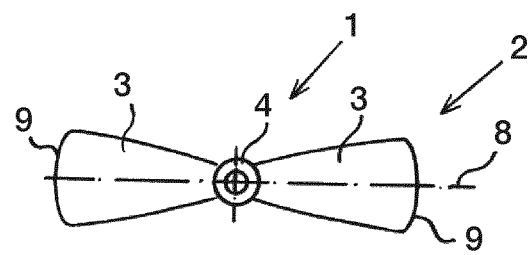
Figure 3:
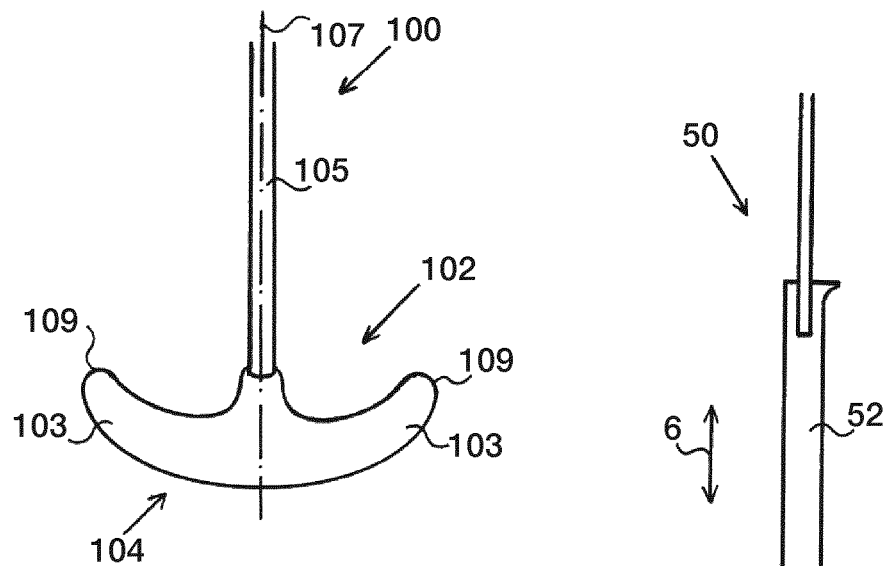
Figure 4:
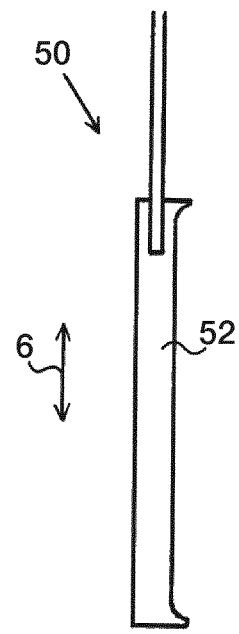
Figure 5:
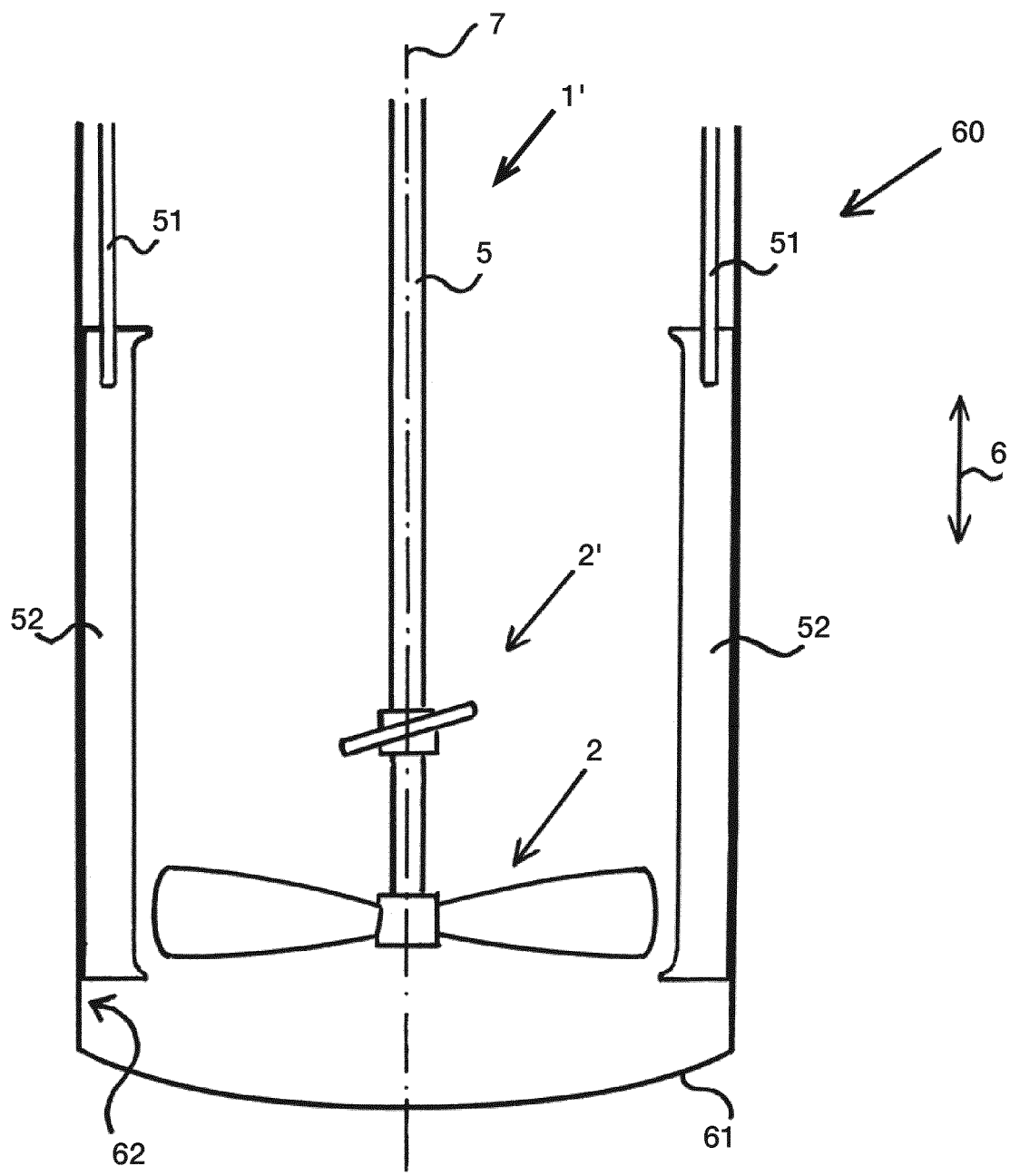

FIG. 1 shows, in 3-dimensional view, an embodiment of a propeller mixer according to the invention, FIG. 2 shows the propeller mixer of FIG. 1 in plan view, FIG. 3 shows, in side view, an embodiment of a blade mixer according to the prior art, FIG. 4 shows, in side view, an embodiment of a baffle according to the invention, and FIG. 5 shows, in side view, an embodiment of a reactor according to the invention, wherein the reactor is shown transparent.

DETAILED DESCRIPTION OF EMBODIMENTS

It has been surprisingly found that the properties of the procatalyst can be improved by an improved method for preparing the solid support. An advantage of the present invention is that support particles having a smaller particle size are obtained which lead to smaller particles of the procatalyst which in turn lead to a higher production rate or yield and bulk density of the polymer product.

An aspect of the invention relates to a multistep process to prepare a procatalyst comprising steps 1), 2), and 3): viz. to a process for the preparation of a procatalyst suitable for preparing a catalyst composition for olefin polymerization, said process comprising the steps of: Step 1a) providing or preparing a Grignard compound; Step 1b) contacting the Grignard compound an alkoxy- or aryloxy silane compound, to give a solid support; Step 2) optionally contacting the solid support obtained with at least one activating compound; and Step 3) reacting the (activated) support with a halogen-containing Ti-compound as catalytic species, optionally an activator and at least one internal electron donor.

Preferably, the Ziegler-Natta type procatalyst in the catalyst system according to the present invention is obtained by the process that is similar to the process as described in EP2027164 B1. Example I including all sub-examples (IA-IE) is incorporated into the present description. More details about the different embodiments are disclosed starting in paragraphs [0016] to [0089]. All these embodiments related to the process and products are incorporated by reference into the present description. In the following part of the description the different steps and phases of the process for preparing the procatalyst according to the present invention will be discussed.

The process for preparing a procatalyst according to the present invention comprises the following phases or steps phase I): preparing a solid support for the procatalyst (Step 1a and Step 1b); this is the key phase according to the present invention;

phase II): optionally activating said solid support obtained in phase I using one or more activating compounds to obtain an activated solid support; (Step 2);

phase III): contacting said solid support obtained in phase I or said activated solid support in phase II with a catalytic species, optionally an activator and at least one internal donor (Step 3).

and optionally Phase IV): modifying said intermediate product obtained in phase III wherein phase IV may comprise one of the following: modifying said intermediate product obtained in phase III with a Group 13- or transition metal modifier in case an internal donor was used during phase III, in order to obtain a procatalyst; modifying said intermediate product obtained in phase III with a Group 13- or transition metal modifier and an internal donor in case an activator was used during phase III, in order to obtain a procatalyst.

The procatalyst thus prepared can be used in polymerization of olefins using e.g. an external electron donor and a co-catalyst. The various steps used to prepare the catalyst according to the present invention are described in more detail below.

Phase I: Preparing a Solid Support for the Catalyst.

The process for preparing the solid support for the procatalyst according to the present invention comprises the following steps: step 1a) provision or preparation of a Grignard reagent; and Step 1b) reacting a Grignard compound with a silane compound.

Step 1a) may include the provision of a previously prepared or commercially obtained Grignard reagent or may include the preparation of a Grignard reagent. Said Grignard reagent that is provided or prepared in step A is a compound $R^4_z MgX^4_{2-z}$. $R^4$ is independently selected from linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms and preferably has from 1 to 20 carbon atoms; preferably $R^4$ is phenyl or butyl, more preferably butyl. $X^4$ is independently selected from the group consisting of fluoride (F—), chloride (Cl—), bromide (Br—) or iodide (I—), preferably chloride. z is in a range of larger than 0 and smaller than 2, being 0<z<2. For example $R^4_z MgX^4_{2-z}$ is n-butyl magnesium chloride or phenyl magnesium chloride wherein $R^4$ is respectively n-butyl and phenyl, z=1 and X=Cl. Step A) including many embodiments, is described in detail in WO2015091984 A1 of the same applicant, page 15 line 14 to page 16, line 28, which complete section is incorporated here by reference.

Step 1b) comprising reacting:

a compound $R^4_z MgX^4_{2-z}$ wherein $R^4$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^4$ is each independently selected from the group of consisting of fluoride (F—), chloride (Cl—), bromide (Br—) or iodide (I—), preferably chloride; z is in a range of larger than 0 and smaller than 2, being 0<z<2;

with a silane compound $Si(OR^5)_{4-n}(R^6)_n$ wherein $R^5$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $R^6$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; n is in range of 0 to 4, preferably n is from 0 up to and including 1;

in a solvent and mixing the resulting mixture with a mixing device and at a certain mixing speed in order to give a solid support $Mg(OR^1)_x X^1_{2-x}$, wherein $R^1$ is the same as $R^5$; $X^1$ is each independently selected from the group of consisting of fluoride (F—), chloride (Cl—), bromide (Br—) or iodide (I—), preferably chloride; and x is in a range of larger than 0 and smaller than 2, being 0<x<2. In the present invention in step 1b) the reaction between $R^4_z MgX^4_{2-z}$ and $Si(OR^5)_{4-n}(R^6)_n$ is carried out in a solvent and the mixture is mixed with a mixing device and at a certain mixing speed. Said mixing device is present within said reactor for preparing said solid support.

In an embodiment, the solvent used for the present invention can be selected from the group consisting of aliphatic, alicyclic or aromatic solvent, containing 4 to 10 carbon atoms. In an embodiment, an ether is used as the solvent, for example diethyl ether, diisopropyl ether, dibutyl ether, diisobutyl ether, diisoamyl ether, diallyl ether, tetrahydrofuran (THF), anisole and ethylphenyl ether. In an embodiment, dibutyl ether (DBE) is used as the solvent.

In an embodiment, the solvent is added to reactor is in such an amount that the solvent fills the reactor volume to at least or more than 25%. In other words, the ratio of solvent volume to reactor volume is at least 25%, meaning that at least or more than 25% of the reactor volume is filled by the solvent; this may also be called the filling ratio of filling amount of the reactor. In an embodiment, this filling ratio is an initial filling ratio, being that the solvent is initially added to the reactor in the described amounts. If the filling volume is less than this, there might be increased deposition of solids on the sides of the reactor in the upper region or there might be an increased risk of splashing when the stirring speed is increased. The present inventors have found that this amount of solvent provides a better control of the particle size.

In an embodiment, the solvent is added to reactor is in such an amount that the solvent fills the reactor volume to at least or more than 30%. In other words, the ratio of solvent volume to reactor volume is at least 30%, meaning that at least or more than 30% of the reactor volume is filled by the solvent. The present inventors have found that this amount of solvent provides a better control of the particle size. In an embodiment, the solvent is added to reactor is in such an amount that the solvent fills the reactor volume to at least or more than 35%. In other words, the ratio of solvent volume to reactor volume is at least 35%, meaning that at least or more than 35% of the reactor volume is filled by the solvent. The present inventors have found that this amount of solvent provides a better control of the particle size. In an embodiment, the solvent is added to reactor is in such an amount that the solvent fills the reactor volume to at most or less than 80%. In other words, the ratio of solvent volume to reactor volume is at most 80%, meaning that at most or less than 80% of the reactor volume is filled by the solvent. If the filling volume is more than this, there is insufficient room for other materials. In an embodiment, the solvent is added to reactor is in such an amount that the solvent fills the reactor volume to at most or less than 70%. In other words, the ratio of solvent volume to reactor volume is at most 70%, meaning that at most or less than 70% of the reactor volume is filled by the solvent. In an embodiment, said mixing device is a propeller mixer 1 according to FIG. 1 and FIG. 2. Normally, in the prior art blade mixers are used, such as the blade mixer 100 according to FIG. 3. The present inventors have observed that by using a different type of mixer the particle size of the solid support is decreased.

The propeller mixer 1 as may be used in the present process has a propeller 2 having two propeller blades 3 extending in opposite directions from a central part 4 of the propeller, which central part is connected to a drive shaft 5 of the propeller mixer 1. When seen in axial direction 6, that means parallel to a central axis of rotation 7 of the propeller mixer 1, the propeller blades 3 widen from a smaller end at the central part 4 to a wider, free, end 9. The propeller blades 3 may be regarded to be sector shaped, having a curved free end 9, again seen in the radial direction. Also, the propeller blades 3 are curved about a radial axis 8 perpendicular to the central axis 7, so as to form a screw propeller. As a result, the propeller blades 3, in use, generate a force component parallel to the central axis 7 on the mixture, that means, transverse to the rotation direction.

In other embodiments the propeller 2 may have one blade or may have more than two blades, such as three or four blades. For example, four blades may be provided each at an angle of 90 degrees with respect to the neighboring blades. The propeller mixer 1 may further have more than one propeller 2, such as two propellers 2, 2' disposed at a distance with respect to each other along the drive shaft 5, as is the case with a blade mixer 1' shown in the example of FIG. 5. The mixer 1' is identical to mixer 1 except for the additional propeller 2'. In the case of more than one propeller 2, the propeller blades of a first propeller of the mixer may be oriented at an angle with respect to the propeller blades of a second propeller of that mixer, when seen in axial direction 6 of the propeller mixer 1. The blades of the upper propeller 2' of the blade mixer 1' of FIG. 5 are provided at 90 degrees with respect to the blades of the lower propeller 2. In the example of FIG. 5, the mixer 1 may be used instead of mixer 1'.

This in contrast to the blade mixer 100 as used in the prior art as shown in FIG. 3. Such a prior art blade mixer 100 has a flat blade 102 extending in a vertical plane, with opposite blade portions 103, on both opposite sides of the vertical, central axis of rotation 7 of the mixer 100. The blade mixer has a drive shaft 105. The flat blade 102 of the blade mixer 100 as used in examples 5 and 8 is of an arc-circle shape having a lower central part 104 and higher, free, opposite ends 109.

FIG. 5 shows a cylindrical reactor 60 having a reactor tank 61. In FIG. 5 only a lower part of the reactor tank 61 is shown; a cover for closing the tank on a top side is not shown. In an embodiment, not only a mixer 1' but also one or more baffles 50 (such as two baffles 50) are present in the reactor 60. These baffles 50 are present on the inner wall 62 of the reactor tank 61. The present inventors have observed that by using these baffles the particle size of the solid support is decreased.

The baffles 50, as also shown in FIG. 4, that may be used according to the present invention, are plate shaped and protrude radially inwards from the inner wall 62 of the reactor tank 61. Also, the baffles extend in the vertical direction 6 of the reactor. In case of the cylindrical reactor as shown in FIG. 5, the baffles are formed by rectangular plates 52 extending in radial and longitudinal, i.e vertical direction of the cylindrical reactor. The baffles 50 are designed to leave a gap between the baffles 50 and the mixer, such as the mixer 1', such as at least 2 mm, or 4 mm. Two baffles 50 are be present inside the reactor 60, at 180 degrees with respect to each other. In another embodiment, no baffles or more than two baffles may be present inside the reactor, e.g. n baffles may be present at an angle of 360/n degrees with respect to each other. The baffles 50 each have a rod 51 for the purpose of mounting them in the reactor tank 61. In other embodiments the baffles may be fixated to the inner wall of the reactor tank without the use of such rods.

The mixing speed depends for example on the size of the reactor. The mixing speeds refer to the reactor upon dosing of the Grignard reagent and the silane compound. Preferably, premixing is conducted of Grignard reagent and the silane compound, e.g. in a mini-mixer. In an embodiment, this is carried out at low temperature (such as below 15 or even below 10° C., e.g. 5° C.) and with a very short residence time in the mini-mixer, e.g. less than 1 minute, or even less than 30 seconds, such as 18-20 seconds. Due to the low temperature and the short mixing time there is a very limited reaction of these two components prior to the addition thereof in the reactor. For a lab scale (0.5 to 2.0 L, e.g. 1.5 L) reactor preferred initial mixing speeds are between 380 and 500 rpm, preferably between 400 and 480 rpm. For a lab scale reactor preferred final mixing speeds are between 500 and 700 rpm, preferably between 530 and 630 rpm. Examples 1-4 below are carried out on laboratory scale (1.5 L reactor) and the initial mixing speed was 400 rpm (Examples 1 and 2), 420 rpm (Example 3) and 470 rpm (Example 4) and the final mixing speed at the dosage stage was 550 rpm (Examples 1, 2 and 3) and 570 rpm (Example 4). Example 5 had an initial mixing speed of 350 rpm and a final mixing speed of 460 rpm. For a pilot scale (10 to 30 L, e.g. 16 L) reactor preferred initial mixing speeds are between 200 and 400 rpm, preferably between 250 and 380 rpm. For a pilot scale reactor preferred final mixing speeds are between 400 and 600 rpm, preferably between 430 and 580 rpm. Examples 6 and 7 are carried out on pilot scale with initial mixing speeds of 280 rpm (Example 6) and 360 rpm (Example 7) and final mixing speeds of 460 rpm (Example 6) and 560 rpm (Example 7). Example 8 had an initial mixing speed of 130 rpm and a final mixing speed of 180 rpm. For a full scale (100 to 6000 L, preferably 1000 to 6000 L, e.g. 2500 L) reactor preferred initial mixing speeds are between 30 and 150 rpm, preferably between 40 and 140 rpm. For a full scale reactor preferred final mixing speeds are between 150 and 250 rpm, preferably between 160 and 230 rpm. In a preferred embodiment, the initial mixing speed is between 30 and 450 rpm, preferably between 100 and 400 rpm. In a preferred embodiment, the final mixing speed is between 150 and 750 rpm, preferably between 450 and 600 rpm.

In an embodiment, a support having a span value of 0.2 to 0.9, preferably 0.3 to 0.6 is obtained with the present invention. The present inventors have observed that by using this type of mixing with a differentiation in the mixing speed, the particle size of the solid support is decreased. By increasing the mixing speed (the initial mixing speed and/or the final mixing speed) the particle size is reduced. When only the initial mixing speed is increased, the particle size is decreased. When both the initial and the final mixing speed are decreased the particle size decreases even further.

Several other embodiments of step 1b) are described in detail in WO2015091984 A1, page 16 line 30 to page 22, line 25, which complete section is incorporated here by reference. Preferably a butyl Grignard is used during step 1b).

Phase II: Activating Said Solid Support for the Catalyst (Step 2).

This step of activating said solid support for the catalyst is an optional step that is not required, but is preferred, in the present invention. This phase may comprise one or more stages.

Step 2) relates to the activation of the solid magnesium compound and this step, including many embodiments, is described in detail in WO2015091984 A1 of the same applicant, page 23 line 3 to page 28, line 14, which complete section is incorporated here by reference. According to the present invention, the solid support and procatalyst preferably have an average particle size (or APS) of between 8 to 17 microns. The particle size is measured using a test method based on ASTM standard test method D4464-201.

Step 2) includes optionally contacting the solid support obtained in step 1) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate reaction product; wherein: $M^1$ is a metal selected from the group consisting of Ti, Zr, Hf, Al or Si; $M^2$ is a metal being Si; v is the valency of $M^1$ or $M^2$ and w<v, such as 0, 1, or 2; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms. Preferably as activating electron donor an alcohol is used, such as methanol or ethanol, ethanol being more preferred. Preferably as metal alkoxide is used a compound wherein $M^1$=Ti, w=0; $R^2$=ethyl, being titanium tetraethoxide (TET). In a preferred embodiment, a combination of both an activating electron donor and a metal alkoxide compound is used, e.g. TET and ethanol. In an embodiment, step 2) comprises two activation steps, wherein during the first activation step an activating electron donor and a metal alkoxide compound of formula $M^1(OR^2)_{v-w}(OR^3)_w$ are used, preferably methanol or ethanol, most preferred ethanol as activating electron donor and titanium tetraethoxide (TET) as metal alkoxide compound. Ethanol is preferred over methanol in view of the toxicity of methanol.

Phase III: Preparing the Procatalyst

Step 3) involves reacting the first or second intermediate reaction product, obtained respectively in step 1) or 2), with a halogen-containing Ti-compound, an activator and at least one internal electron donor. This phase may be carried out in one or in several sub steps.

An example of an embodiment having several sub steps includes:

3-I) in a first stage: contacting the first or second intermediate reaction product, obtained respectively in step 1) or 2), with a halogen-containing Ti-compound, an activator and optionally a portion of an internal electron donor;

3-II) in a second stage: contacting the product obtained in step 3-I) with a halogen-containing Ti-compound, and optionally a portion of an internal electron donor;

3-III) in a third stage: contacting the product obtained in step 3-II) with a halogen-containing Ti-compound, and optionally a portion of an internal electron donor;

3-IV) optionally in a fourth stage: contacting the product obtained in step 3-III) with a halogen-containing Ti-compound, and optionally a portion of an internal electron donor;

wherein preferably said internal electron donor is added in at least two portions during at least two of the stages 3-I, 3-II, 3-III, and 3-IV to obtain said procatalyst. This phase III, also called phase D, is described in detail in WO2015091984 A1 of the same applicant, page 28 line 15 to page 31, line 13, which complete section is incorporated here by reference.

Phase III may comprise several stages (e.g. I, II and III and optionally IV). During each of these consecutive stages the solid support is contacted with a catalytic species. In other words, the addition or reaction of said catalytic species may be repeated one or more times. Preferably, the same catalytic species is used each stage. Preferably $TiCl_4$ is used as catalytic species in all stages of step 3). The catalyst species may be added first followed by addition of an activator and/or donor in any of the stages.

Catalytic Species

Step 3) involves, in all sub steps reacting the (activated) solid support with a transition metal halide (e.g. titanium halide, chromium halide, hafnium halide, zirconium halide, vanadium halide) but preferably titanium halide, e.g. $TiX_4$ wherein X is chloride or fluoride, preferably chloride. Step 3 (also called step iii) or step D) is described in detail in WO2015091984 A1 page 29 line 28 to page 31, line 13, which complete section is incorporated here by reference.

Activator

An activator is added during step 3). The molar ratio of the activator relative to the magnesium may vary between wide limits, for instance from 0.02 to 1.0. Preferably, this molar ratio is from 0.05 to 0.8; more preferably from 0.1 to 0.6; and most preferably from 0.1 to 0.5. In an embodiment, an activator is present during this step 3). Several types of activators can be used, such as benzamide, alkylbenzoates, and monoesters. Each of these will be discussed below.

A benzamide activator has a structure as disclosed in WO2015091983 A1 of the same applicant, page 13, line 13-page 14, line 37, which complete section is incorporated here by reference. A benzamide activator has a structure according to formula X:

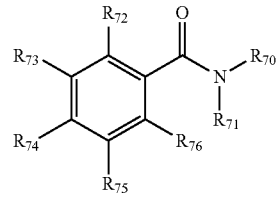

$R^{70}$ and $R^{71}$ are each independently selected from hydrogen or an alkyl. Preferably, said alkyl has from 1 to 6 carbon atoms, more preferably from 1 to 3 carbon atoms. More preferably, $R^{70}$ and $R^{71}$ are each independently selected from hydrogen or methyl. $R^{72}$, $R^{73}$, $R^{74}$, $R^{75}$, $R^{76}$ are each independently selected from hydrogen, a heteroatom (preferably a halide), or a hydrocarbyl group, selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms.

Suitable non-limiting examples of "benzamides" include benzamide ($R^{70}$ and $R^{71}$ are both hydrogen and each of $R^{72}$, $R^{73}$, $R^{74}$, $R^{75}$, $R^{76}$ are hydrogen) also denoted as BA-2H or methylbenzamide ($R^{70}$ is hydrogen; $R^{71}$ is methyl and each of $R^{72}$, $R^{73}$, $R^{74}$, $R^{75}$, $R^{76}$ are hydrogen) also denoted as BA-HMe or dimethylbenzamide ($R^{70}$ and $R^{71}$ are methyl and each of $R^{72}$, $R^{73}$, $R^{74}$, $R^{75}$, $R^{76}$ are hydrogen) also denoted as BA-2Me. Other examples include monoethylbenzamide, diethylbenzamide, methylethylbenzamide, 2-(trifluor-methyl)benzamide, N,N-dimethyl-2-(trifluormethyl)benzamide, 3-(trifluormethyl)-benzamide, N,N-dimethyl-3-(trifluormethyl)-benzamide, 2,4-dihydroxy-N-(2-hydroxyethyl)-benzamide, N-(1H-benzotriazol-1-ylmethyl) benzamide, 1-(4-ethylbenzoyl)piperazine, 1-benzoylpiperidine.

Without wishing to be bound by a particular theory the present inventors believe that the fact that the most effective activation is obtained when the benzamide activator is added during stage I has the following reason. It is believed that the benzamide activator will bind the catalytic species and is later on substituted by the internal donor when the internal donor is added.

A detailed description of regarding the use of mono-esters as activators is to be found in WO2015091984 A1 of the same applicant, page 42 line 12-page 43, line 24, which section is incorporated here by reference. A detailed description of regarding the use of alkylbenzoates as activators is to be found in WO2015091984 A1 of the same applicant, page 42 lines 1-12, which section is incorporated here by reference. The activation is for example selected from the group consisting of butyl formate, ethyl acetate, amyl acetate, butyl acetate, ethyl acrylate, methyl methacrylate, isobutyl methacrylate, an alkyl benzoate, such as ethyl p-methoxy benzoate, methyl p-ethoxybenzoate, ethyl p-ethoxybenzoate, ethyl benzoate, methyl benzoate, propyl benzoate, ethyl p-chlorobenzoate, ethyl p-bromobenzoate, methyl-p-toluate and ethyl-naphthate; preferably ethyl acetate, ethyl benzoate, benzoyl chloride, ethyl p-bromobenzoate, n-propyl benzoate, and benzoic anhydride, more preferably ethyl benzoate.

Internal Donors

An internal electron donor is also present during step 3). Also mixtures of internal electron donors can be used. Examples of internal electron donors are disclosed below. The molar ratio of the internal electron donor relative to the magnesium may vary between wide limits, for instance from 0.01 to 0.75. Preferably, this molar ratio is from 0.02 to 0.5; more preferably from 0.03 to 0.3. The internal donor may be added in one single portion during one of the stages I, II, III or IV. The internal donor may also be added in split portions, e.g. in two portions or in three portions or even more. When the internal donor is added in two portions it may for example be added in Stage I and II or in stage II and III. When the internal donor is added in three portions, it may for example be added in stages I, II and III or in stages II, III and IV.

In an embodiment, as internal donor a carbonate-carbamate compound according to formula A is used:

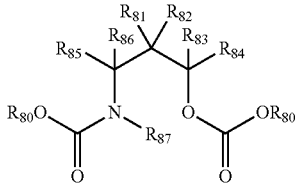

wherein: $R^{81}$, $R^{82}$, $R^{83}$, $R^{84}$, $R^{85}$, and $R^{86}$ are the same or different and are independently selected from a group consisting of hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; $R^{87}$ is a hydrogen or a linear, branched or cyclic hydrocarbyl group, selected from alkyl, alkenyl, aryl, aralkyl, alkoxycarbonyl or alkylaryl groups, and one or more combinations thereof, preferably having from 1 to 20 carbon atoms; each $R^{80}$ group is independently a linear, branched or cyclic hydrocarbyl group selected from alkyl, alkenyl, aryl, aralkyl, or alkylaryl groups, and one or more combinations thereof, preferably having from 1 to 30 carbon atoms; $R^{80}$ is preferably selected from the group consisting of alkyl having 1 to 30 carbon atoms, preferably 1 to 20 carbon atoms, more preferably 1 to 6 carbon atoms, even more preferably methyl, ethyl, n propyl, i-propyl, n-butyl, 2-butyl, t-butyl, pentyl or hexyl, most preferably ethyl. N is a nitrogen atom; O is an oxygen atom; and C is a carbon atom; preferably 4-[(ethoxycarbonyl)(methyl)amino]pentan-2-yl ethyl carbamate (AB-OEt). More information about this internal electron donor an several embodiments can be found in in WO2015/185489 which is incorporated by reference into the present application. The preparation of this donor is disclosed in WO2015/185489, Example A which is incorporated by reference into the present application. More information about this internal electron donor an several embodiments can be found in in WO2015/185489 which is incorporated by reference into the present application. The preparation of this donor is disclosed in WO2015/185489, Example A which is incorporated by reference into the present application.

In an embodiment, as internal donor an aminobenzoate compound according to Formula B is used

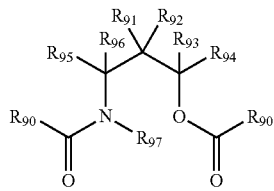

wherein: each $R^{90}$ group is independently a substituted or unsubstituted aromatic group; $R^{91}$, $R^{92}$, $R^{93}$, $R^{94}$, $R^{95}$, $R^{96}$ and $R^{97}$ are each independently the same or different and are independently selected from a group consisting of hydrogen or a linear, branched or cyclic hydrocarbyl group, selected from alkyl, alkenyl, aryl, aralkyl, or alkylaryl groups, and one or more combinations thereof, preferably having from 1 to 20 carbon atoms; N is nitrogen atom; O is oxygen atom; and C is carbon atom; preferably 4-[benzoyl(methyl)amino]pentan-2-yl benzoate (AB). More information about this internal electron donor an several embodiments can be found in in WO2014/001257 which is incorporated by reference into the present application. The preparation of this donor is disclosed in WO2014/001257, Examples which is incorporated by reference into the present application.

In an embodiment, as internal donor a 1,3-diether represented by the Formula C, is used:

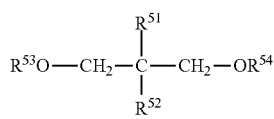

wherein $R^{51}$ and $R^{52}$ are each independently selected from a hydrogen or a hydrocarbyl group selected from alkyl, alkenyl, aryl, aralkyl, alkoxycarbonyl or alkylaryl groups, and one or more combinations thereof, and wherein $R^{53}$ and $R^{54}$ are each independently a hydrocarbyl group, selected from e.g. alkyl, alkenyl, aryl, aralkyl, alkoxycarbonyl or alkylaryl groups, and one or more combinations thereof. Said hydrocarbyl group of $R^{53}$-$R^{54}$ may be linear, branched or cyclic; it may be substituted or unsubstituted; it may contain one or more heteroatoms; it may have from 1 to 10 carbon atoms, preferably from 1 to 8 carbon atoms, more preferably from 1-6 carbon atom, preferably 9,9-bis(methoxymethyl)fluorene (Flu). More information about this internal electron donor an several embodiments can be found in in WO2015/091983 which is incorporated by reference into the present application.

Co-Catalyst

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", as described in WO2015091984 A1 of the same applicant, page 59 line 1 to page 60 line 30, which is incorporated here by reference.

External Electron Donor

The catalyst system according to the present invention preferably comprises an external electron donor. One of the functions of an external donor compound is to affect the stereoselectivity of the catalyst system in polymerization of olefins having three or more carbon atoms. Therefore it may be also referred to as a selectivity control agent. Examples of external donors suitable for use in the present invention are the internal donors benzoic acid esters and 1,3-diethers. In addition, the following external donors may be used: alkylamino-alkoxysilanes, alkyl-alkoxysilane, imidosilanes, and alkylimidosilanes. The aluminum/external donor molar ratio in the polymerization catalyst system preferably is from 0.1 to 200; more preferably from 1 to 100. Mixtures of external donors may be present and may include from about 0.1 mol. % to about 99.9 mol. % of a first external donor and from about 99.9 mol. % to about 0.1 mol. % of either a second or the additional alkoxysilane external donor disclosed below. When a silane external donor is used, the Si/Ti molar ratio in the catalyst system can range from 0.1 to 80, preferably from 0.1 to 60, even more preferably from 1 to 50 and most preferably from 2 to 30.

Documents EP1538167 and EP1783145 disclose a Ziegler-Natta catalyst type comprising an organo-silicon compound as external donor that is represented by formula $Si(OR^c)_3(NR^dR^e)$, wherein $R^c$ is a hydrocarbon group having 1 to 6 carbon atoms, $R^d$ is a hydrocarbon group having 1 to 12 carbon atoms or hydrogen atom, and $R^e$ is a hydrocarbon group having 1 to 12 carbon atoms used as an external electron donor. Examples of suitable external donors according to the present invention are known from WO2015091984 A1, being compounds according to Formula III, alkyl-alkoxysilanes according to Formula IV, organosilicon compounds having formula $Si(OR^a)_{4-n}R^b_n$, imidosilanes according to Formula I, alkylimidosilanes according to Formula I' as described on page 61 line 26 to page 67 line 8 which is incorporated here by reference. Alkoxy silane halide are used for preparing imidosilane and alkylimidosilane internal donors and are, respectively, according to Formula XXIVa: $Z_nSi(OR^{11})_{4-n}$ and Formula XXIVa: $Z_nSi(OR^{11})_{4-n-m}(R^{12})_m$. In the alkoxy silane halide represented by Formula XXIVa and XXIVb, Z is halogen group, and more preferably a chlorine group; n=1, 2 or 3 and m=1 or 2. Specific examples regarding the external donor, considering Formula I' in WO2015091984 A1, are described in WO2015091984 A1 of the same applicant, page 67 lines 9-22, which is incorporated here by reference.

The additional compound(s) in the external donor according to the invention may be one or more alkoxysilanes, as described in WO2015091984 A1 of the same applicant, page 67 line 24 to page 69 line 4, which section is incorporated here by reference. In an embodiment, the silane-compound for the additional external donor is dicyclopentyl dimethoxysilane, di-isopropyl dimethoxysilane, di-isobutyl dimethoxysilane, methylcyclohexyl dimethoxysilane, n-propyl trimethoxysilane, n-propyltriethoxysilane, dimethylamino triethoxysilane, and one or more combinations thereof. Preferably, the external donor is an alkyl-alkoxysilane according to formula IV (preferably n-propyl trimethoxysilane or n-propyl triethoxysilane) or cyclohexylmethyldimethoxysilane or another dialkyldialkoxysilane.

Catalyst System

The invention also relates to a process to make the catalyst system by contacting a Ziegler-Natta type procatalyst, a co-catalyst and optionally one or more external electron donors. The procatalyst, the co-catalyst and the external donor(s) can be contacted in any way known to the skilled person in the art; and as also described herein, more specifically as in the Examples. The invention further relates to a process of preparing a polyolefin by contacting at least one olefin with a polymerization catalyst system comprising the procatalyst according to the present invention. Preferably, the polyolefin made by using the catalyst system of the present invention is a polypropylene. For instance, the external donor in the catalyst system according to the present invention can be complexed with the co-catalyst and mixed with the procatalyst (pre-mix) prior to contact between the procatalyst and the olefin. The external donor can also be added independently to the polymerization reactor. The procatalyst, the co-catalyst, and the external donor can be mixed or otherwise combined prior to addition to the polymerization reactor. Contacting the olefin with the catalyst system according to the present invention can be done under standard polymerization conditions, known to the skilled person in the art. See for example Pasquini, N. (ed.) "Polypropylene handbook" $2^{nd}$ edition, Carl Hanser Verlag Munich, 2005. Chapter 6.2 and references cited therein.

Polymerization Process

The polymerization process may be a gas phase, a slurry or a bulk polymerization process, operating in one or more than one reactor. One or more olefin monomers can be introduced in a polymerization reactor to react with the procatalyst and to form an olefin-based polymer (or a fluidized bed or agitated bed of polymer particles). Polymerization in a slurry (liquid phase) as well as information about the polyolefins that are/may be prepared are described in WO2015091984 A1 of the same applicant, page 70 line 15 10 to page 71 line 23 which section is incorporated here by reference; information about gas-phase polymerization processes are as described in WO2015091984 A1 of the same applicant, page 71 line 25 to page 72 line 26 which is incorporated here by reference.

Olefin

The olefin according to the invention may be selected from mono- and di-olefins containing from 2 to 40 carbon atoms; see also WO2015091984 A1 of the same applicant, page 72 line 28 to page 73 line 5 which section is incorporated here by reference. Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butene, hexene, heptene, octene.

Polyolefin

The present invention also relates to a polyolefin, preferably a polypropylene obtained or obtainable by a process, comprising contacting an olefin, preferably propylene or a mixture of propylene and ethylene with the procatalyst according to the present invention. More information about the polymers formed is disclosed WO2015091984 A1 of the same applicant, page 73 lines 6-23 and 25-34 and page 74 line 26 page 75, line 24 which section is incorporated by reference entirely. The present invention also relates to a polyolefin, preferably a propylene-based polymer obtained or obtainable by a process as described herein above, comprising contacting propylene or a mixture of propylene and ethylene with a catalyst system according to the present invention. In one embodiment the present invention relates to the production of a homopolymer of polypropylene. Several polymer properties are discussed here. Xylene soluble fraction (XS) is preferably from about 0.5 wt % to about 10 wt %, or from about 0.5 wt % to about 8 wt %, or from 1.0 to 6 wt %. The production rate is preferably from about 1 kg/g/hr to about 100 kg/g/hr, or from about 20 kg/g/hr to about 90 kg/g/hr. MFR is preferably from about 0.01 g/10 min to about 2000 g/10 min, or from about 0.01 g/10 min to about 1000 g/10 min; or from about 0.1 g/10 min to about 500 g/10 min, or from about 0.5 g/10 min to about 150 g/10 min, or from about 1 g/10 min to about 100 g/10 min.

Use of Polyolefin

The invention also relates to the use of the polyolefins, preferably the propylene-based polymers (also called polypropylenes) according to the invention in injection moulding, blow moulding, extrusion moulding, compression moulding, casting, thin-walled injection moulding, etc. for example in food contact applications. Furthermore, the invention relates to a shaped article comprising the polyolefin, preferably the propylene-based polymer according to the present invention. The polyolefin, preferably the propylene-based polymer according to the present invention may be transformed into shaped (semi)-finished articles using a variety of processing techniques. Examples of suitable processing techniques include injection moulding, injection compression moulding, thin wall injection moulding, extrusion, and extrusion compression moulding. Injection moulding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection moulding may for example be used to make thin wall packaging applications both for food and non-food segments. This includes pails and containers and yellow fats/ margarine tubs and dairy cups.

The invention is now further elucidated by the following non-limiting examples.

Example 1

Step A) Butyl Grignard Formation

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the colour of the iodine had disappeared, the temperature was raised to 80° C. and a mixture of n-chlorobutane (105 ml) and dibutyl ether (830 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butylmagnesiumchloride with a concentration of 0.9 mole Mg/L was obtained.

Step B) Preparation of the First Intermediate Reaction Product 350 ml of dibutyl ether was introduced to 1.5 liter reactor. The reactor was fitted by propeller stirrer. The reactor was thermostated at 35° C. The solution of reaction product of step A (480 ml, 0.432 mol Mg) and 240 ml of a solution of tetraethoxysilane (TES) in dibutyl ether (DBE), (48.2 ml of TES and 192 ml of DBE), were cooled to 5° C., and then were dosed simultaneously to a mixing device of 0.45 ml volume supplied with a stirrer and jacket. Dosing time was 360 min. Thereafter the premixed reaction product A and the TES-solution were introduced to a reactor by connective tube of volume 0.25 ml. The mixing device (mini-mixer) was cooled to 5° C. by means of cold water circulating in the mini-mixer's jacket. The stirring speed in the mini-mixer was 1000 rpm. The stirring speed in reactor was 400 rpm at the beginning of dosing and was gradually increased up to 550 rpm at the end of dosing stage. On the dosing completion the reaction mixture was heated up to 60° C. and kept at this temperature for 1 hour. Then the stirring was stopped and the solid substance was allowed to settle. The supernatant was removed by decanting. The solid substance was washed three times using 500 ml of heptane. As a result, a pale yellow solid substance, reaction product B (the solid first intermediate reaction product; the support), was obtained, suspended in 200 ml of heptane. The average particle size of support was 17.0 μm and span value $(d_{90}-d_{10})/d_{50}=0.5$.

Step C) Preparation of the Second Intermediate Reaction Product

In inert nitrogen atmosphere at 20° C. a 250 ml glass flask equipped with a mechanical agitator is filled with slurry of 5 g of reaction product of step B dispersed in 60 ml of heptane. Subsequently a solution of 0.88 ml ethanol (EtOH/Mg=0.4) in 20 ml heptane is dosed under stirring during 1 hour. After keeping the reaction mixture at 20° C. for 30 minutes, a solution of 0.79 ml titanium tetraethoxide (TET/Mg=0.1) in 20 ml of heptane was added for 1 hour. The slurry was slowly allowed to warm up to 30° C. for 90 min and kept at that temperature for another 2 hours. Finally the supernatant liquid is decanted from the solid reaction product (the second intermediate reaction product; activated support) which was washed once with 90 ml of heptane at 30° C.

Step D) Preparation of the Catalyst Component

A reactor was brought under nitrogen and 125 ml of titanium tetrachloride was added to it. A suspension, containing about 5.8 g of activated support (step C) in 15 ml of heptane, was added to the reactor under stirring. Then the temperature of reaction mixture was increased to 110° C. for 60 min and 2.0 ml of DnBP in 3 ml of heptane was added to reactor and the reaction mixture was kept at 115° C. for 90 min. Then the stirring was stopped and the solid substance was allowed to settle. The supernatant was removed by decanting, after which the solid product was washed with chlorobenzene (125 ml) at 100° C. for 20 min. Then the washing solution was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting, and the last treatment was repeated once again. The solid substance obtained was washed five times using 150 ml of heptane at decreasing temperature: from 60 to 25° C., after which the catalyst component, suspended in heptane, was obtained.

Step E) Polymerization of Propylene

Polymerization of propylene was carried out in a stainless steel reactor (with a volume of 0.7 l) in heptane (300 ml) at a temperature of 70° C., total pressure 0.7 MPa and hydrogen presence (55 ml) for 1 hour in the presence of a catalyst system comprising the catalyst component according to step D, triethylaluminium as co-catalyst and cyclohexyl-methyl-dimethoxysilane (CHMDMS) as external donor. The concentration of the catalyst component was 0.033 g/L; the concentration of triethylaluminium was 4.0 mmol/L; the concentration of CHMDMS was 0.2 mmol/L. Results are presented in Table.

Example 2

Example 1 was repeated, except for the fact that in step B reactor was fitted by propeller stirrer and additionally by two baffles. As a result, the support with average particle size of 13.5 μm and span value $(d_{90}-d_{10})/d_{50}=0.66$ was obtained.

Example 3

Example 2 was repeated, except for the fact that in step B 420 ml of dibutyl ether was introduced to 1.5 liter reactor and the stirring speed in reactor was 420 rpm at the beginning of dosing and was gradually increased up to 550 rpm at the end of dosing stage. As a result, the support with average particle size of 12.9 μm and span value $(d_{90}-d_{10})/d_{50}=0.60$ was obtained.

Example 4

Example 3 was repeated, except for the fact that in step B the stirring speed in reactor was 470 rpm at the beginning of dosing and was gradually increased up to 570 rpm at the end of dosing stage. As a result, the support with average particle size of 10.5 μm and span value $(d_{90}-d_{10})/d_{50}=0.50$ was obtained.

Example 5

Example 5 was performed similar to Example 1 except for the fact that in step B reactor was fitted by blade stirrer and the stirring speed in reactor was 350 rpm at the beginning of dosing and was gradually increased up to 500 rpm at the end of dosing stage. As a result, support with average particle size of 21 μm and span value $(d_{90}-d_{10})/d_{50}=0.30$ was obtained and activity of catalyst prepared from this support was lower compared the activities of catalysts with lower particles size (Examples 1 to 4).

Example 6

Example 6 was performed in pilot scale in 16 L reactor. Step A) butyl Grignard formation was performed by procedure similar to procedure Example 1 but total amounts of reagents were: magnesium (260 g); n-chlorobutane (1070 ml); dibutyl ether (10.5 L); iodine (0.5 g). As result a solution of butylmagnesiumchloride with a concentration of 0.86 mole Mg/L was obtained.

Step B) Preparation of the First Intermediate Reaction Product 6.5 L of dibutyl ether was introduced to a 16 liter reactor. The reactor was fitted by propeller stirrer and two baffles. The reactor was thermostated at 35° C. The solution of reaction product of step A (5.44 L, 4.678 mol Mg) and 1700 ml of a solution of tetraethoxysilane (TES) in dibutyl ether (DBE), (522 ml of TES and 1178 ml of DBE), were cooled to 5° C., and then were dosed simultaneously to a mixing device of 5.6 ml volume supplied with a stirrer and jacket. Dosing time was 340 min. Thereafter the premixed reaction product A and the TES-solution were introduced to a reactor by connective tube of volume 0.7 ml. The mixing device (mini-mixer) was cooled to 5° C. by means of cold water circulating in the mini-mixer's jacket. The stirring speed in the mini-mixer was 800 rpm. The stirring speed in reactor was 280 rpm at the beginning of dosing and was gradually increased up to 460 rpm at the end of dosing stage. On the dosing completion the reaction mixture was heated up to 60° C. and kept at this temperature for 1 hour. Then the stirring was stopped and the solid substance was allowed to settle. The supernatant was removed by decanting. The solid substance was washed three times using 7.5 L ml of heptane. As a result, a pale yellow solid substance, reaction product B (the solid first intermediate reaction product; the support), was obtained, suspended in 2 L of heptane. As a result, support with average particle size of 13.5 μm and span value $(d_{90}-d_{10})/d_{50}=0.30$ was obtained. Steps C-E were performed similar Example 1.

Example 7

Example 7 was performed like Example 6 in 16 L reactor, but in Step B 5 L of dibutyl ether was introduced to reactor and stirring speed was 360 rpm at the beginning of dosing and was gradually increased up to 560 rpm at the end of dosing stage. As a result, support with average particle size of 9.0 μm and span value $(d_{90}-d_{10})/d_{50}=0.42$ was obtained.

Example 8

Example 8 was performed similar to Example 7 in 16 L reactor except for the fact that in step B reactor was fitted by blade stirrer, 4 L of dibutyl ether was introduced to reactor and the stirring speed in reactor was 130 rpm at the beginning of dosing and was gradually increased up to 180 rpm at the end of dosing stage. As a result, the support with average particle size of 25.7 μm and span value $(d_{90}-d_{10})/d_{50}=0.70$ was obtained and activity of catalyst prepared from this support was lower compared the activities of catalysts with lower particles size (Examples 6 to 7). The results are shown in the Table below.

TABLE

Results.

| Example No. | Support preparation | | | | | | Ti, in cat. wt. % | PP yield, kg/g cat. | XS, wt. % | BD of PP, Kg/m³ | $M_w/M_n$ |
|---|---|---|---|---|---|---|---|---|---|---|---|
| | Mixer type | Baffles | Speed mixing, rpm | Reactor Volume L | Support μm | Span | Solvent volume to reactor volume ratio | | | | |
| 1 | propeller | – | 400-550 | 1.5 | 17.0 | 0.50 | 23% | 1.9 | 13.7 | 2.5 | 450 | 5.1 |
| 2 | propeller | + | 400-550 | 1.5 | 13.5 | 0.66 | 23% | 1.8 | 14.8 | 2.7 | 445 | 4.8 |
| 3 | propeller | + | 420-550 | 1.5 | 12.9 | 0.60 | 28% | 1.6 | 16.0 | 2.2 | 450 | 5.0 |
| 4 | propeller | + | 470-570 | 1.5 | 10.5 | 0.50 | 28% | 2.3 | 18.0 | 2.0 | 460 | 4.6 |
| 5 | blade | – | 350-500 | 1.5 | 21.0 | 0.30 | 23% | 1.9 | 12.5 | 2.4 | 450 | 5.2 |
| 6 | propeller | + | 280-460 | 16 | 13.5 | 0.30 | 41% | 2.3 | 18.2 | 2.0 | 480 | 4.3 |
| 7 | propeller | + | 360-560 | 16 | 9.0 | 0.42 | 31% | 2.4 | 17.4 | 2.0 | 470 | 4.5 |
| 8 | blade | – | 130-180 | 16 | 25.7 | 0.70 | 25% | 1.8 | 12.7 | 1.8 | 450 | 5.1 |

It has been surprisingly found by the present inventors that support particles having a small particle size are obtained by the inventive process of support synthesis, leading to small particles of the procatalyst which in turn lead to a high production rate or yield and bulk density of the polymer product. A further surprising feature of the present invention is that product with narrow molecular weight distribution ($M_w/M_n$) is obtained with the small size support particles produced in the present invention.

CLAUSES

1. A process for preparing a solid support for a procatalyst suitable for preparing a catalyst composition for olefin polymerization, said process for preparing said solid support comprising reacting:
a compound $R^4_zMgX^4_{2-z}$ wherein
 $R^4$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; preferably $R^4$ is butyl;
 $X^4$ is each independently selected from the group of consisting of fluoride (F—), chloride (Cl—), bromide (Br—) or iodide (I—), preferably chloride;
 z is in a range of larger than 0 and smaller than 2, being 0<z<2;
with a silane compound $Si(OR^5)_{4-n}(R^6)_n$ wherein
 $R^5$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
 $R^6$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
 n is in range of 0 to 4, preferably n is from 0 up to and including 1;

in a solvent and mixing the resulting mixture with a mixing device and at a certain mixing speed in order to give a solid support $Mg(OR^1)_xX^1_{2-x}$, wherein $R^1$ is the same as $R^5$; $X^1$ is each independently selected from the group of consisting of fluoride (F—), chloride (Cl—), bromide (Br—) or iodide (I—), preferably chloride; and x is in a range of larger than 0 and smaller than 2, being 0<x<2;
wherein the mixing is started with an initial mixing speed and wherein the speed is increased to a final mixing speed wherein the initial mixing speed is lower than the final mixing speed,
preferably, in case the reaction is carried out in a lab scale reactor of 0.5 L to 2.0 L, wherein the initial mixing speed is between 380 and 500 rpm, preferably between 400 and 480 rpm and/or wherein the final mixing speed is between 500 and 700 rpm, preferably between 530 and 630 rpm.

2. A process for preparing a solid support for a procatalyst suitable for preparing a catalyst composition for olefin polymerization, said process for preparing said solid support comprising reacting:
a compound $R^4_zMgX^4_{2-z}$ wherein
 $R^4$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; preferably $R^4$ is butyl;
 $X^4$ is each independently selected from the group of consisting of fluoride (F—), chloride (Cl—), bromide (Br—) or iodide (I—), preferably chloride;
 z is in a range of larger than 0 and smaller than 2, being 0<z<2;
with a silane compound $Si(OR^5)_{4-n}(R^6)_n$ wherein
 $R^5$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
 $R^6$ is each independently linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms;
n is in range of 0 to 4, preferably n is from 0 up to and including 1;
in a solvent and mixing the resulting mixture with a mixing device and at a certain mixing speed in order to give a solid support $Mg(OR^1)_x X^1_{2-x}$, wherein $R^1$ is the same as $R^5$; $X^1$ is each independently selected from the group of consisting of fluoride (F—), chloride (Cl—), bromide (Br—) or iodide (I—), preferably chloride; and x is in a range of larger than 0 and smaller than 2, being 0<x<2;
wherein the mixing is started with an initial mixing speed and wherein the speed is increased to a final mixing speed wherein the initial mixing speed is lower than the final mixing speed,
preferably, in case the reaction is carried out in a pilot scale reactor of 10 L to 30 L, wherein the mixing is started with an initial mixing speed and wherein the speed is increased to a final mixing speed wherein the initial mixing speed is lower than the final mixing speed, preferably wherein the initial mixing speed is between 200 and 400 rpm, preferably between 250 and 380 rpm and/or wherein the final mixing speed is between 400 and 600 rpm, preferably between 430 and 580 rpm.

3. Process according to clause 1 or 2, wherein a mixing device with propeller blades is used.

4. Process according to clause 1 or 2 or 3, wherein a reactor with at least two baffles is used.

The invention claimed is:

1. A process for preparing a procatalyst for preparing a catalyst composition for olefin polymerization, said process comprising the steps of:
Step 1) preparing a solid support by reacting:
a compound $R^4_z MgX^4_{2-z}$ wherein
$R^4$ is each independently a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group is substituted or unsubstituted and optionally contains one or more heteroatoms;
$X^4$ is each independently a fluoride (F—), chloride (Cl—), bromide (Br—) or iodide (I—);
z is in a range of larger than 0 and smaller than 2, being 0<z<2;
with a silane compound $Si(OR^5)_{4-n}(R^6)_n$ wherein
$R^5$ is each independently a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group is substituted or unsubstituted and optionally contains one or more heteroatoms;
$R^6$ is each independently a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group is substituted or unsubstituted and optionally contains one or more heteroatoms;
n is in range of 0 to 4;
in a solvent and mixing the resulting mixture with a mixing device and at a certain mixing speed in order to give a solid support $Mg(OR^1)_x X^1_{2-x}$, wherein $R^1$ is the same as $R^5$; $X^1$ is each independently a fluoride (F—), chloride (Cl—), bromide (Br—) or iodide (I—); and x is in a range of larger than 0 and smaller than 2, being 0<x<2;
wherein the reaction is carried out in a full scale reactor of 100 L to 6000 L, the mixing is started with an initial mixing speed and the speed is increased to a final mixing speed wherein the initial mixing speed is lower than the final mixing speed, wherein the initial mixing speed is between 30 to 150 rpm, and the final mixing speed is between 160 to 230 rpm, and
wherein the solid support obtained in step 1) has an average particle size of at most 17 μm;
Step 2) optionally contacting the solid support obtained in step 1) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain an intermediate reaction product; wherein: $M^1$ is a metal of Ti, Zr, Hf, Al or Si; $M^2$ is a metal being Si; v is the valency of $M^1$ or $M^2$ and w<v; $R^2$ and $R^3$ are each a linear, branched or cyclic hydrocarbyl group independently selected from alkyl, alkenyl, aryl, aralkyl, alkoxycarbonyl, alkylaryl groups, and one or more combinations thereof; wherein said hydrocarbyl group is substituted or unsubstituted and optionally contains one or more heteroatoms; and
Step 3) reacting the solid support or intermediate reaction product, obtained respectively in step 1) or 2), with a halogen-containing Ti-compound, an activator and at least one internal electron donor to obtain a procatalyst,
wherein the activator in step 3) is ethylbenzoate and the internal electron donor in step 3) is 4-[benzoyl(methyl) amino]pentan-2-yl benzoate.

2. The process according to claim 1, wherein a mixing device with propeller blades is used and/or wherein a reactor with at least two baffles is used.

3. The process according to claim 1, wherein dibutyl ether is used as a solvent.

4. The process according to claim 3, wherein the solvent is added to reactor in such an amount that the solvent volume to reactor volume ratio is greater than 25%.

5. The process according to claim 1, wherein in $R^2$ and $R^3$, each of said hydrocarbyl groups contains 1 to 20 carbon atoms and n is from 0 up to and including 1.

6. The process according to claim 1, wherein $R^4$ is butyl and $X^4$ is chloride.

7. The process according to claim 1, wherein in $R^4$ and $R^5$, each of said hydrocarbyl groups contains 1 to 20 carbon atoms.

8. The process according to claim 1, wherein the reaction is carried out in a full scale reactor of 1000 L to 6000 L, the initial mixing speed is between 40 and 140 rpm and the final mixing speed is 160 and 230 rpm.

9. A process for the preparation of a polyolefin comprising preparing a procatalyst according to the process of claim 1,
combining the procatalyst with a co-catalyst and optionally an external electron donor to form a catalyst system, and
contacting the catalyst system with at least one olefin to prepare the polyolefin.

10. The process according to claim 9, wherein the at least one olefin comprises propylene.

* * * * *